United States Patent
Ku et al.

(10) Patent No.: US 7,375,486 B2
(45) Date of Patent: May 20, 2008

(54) METHOD AND CIRCUIT FOR CONTROLLING MOTOR SPEED

(75) Inventors: Chin-Long Ku, Guangdong (CN); Chin-Wen Yeh, Guangdong (CN)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 61 days.

(21) Appl. No.: 11/308,873

(22) Filed: May 18, 2006

(65) Prior Publication Data
US 2007/0096665 A1 May 3, 2007

(30) Foreign Application Priority Data
Nov. 3, 2005 (CN) .................. 2005 1 0100955

(51) Int. Cl.
*G05B 11/28* (2006.01)
(52) U.S. Cl. ............... 318/599; 318/254; 318/138; 318/439; 318/471; 388/811
(58) Field of Classification Search ............ 318/254, 318/138, 439, 471, 599; 388/800, 811
See application file for complete search history.

(56) References Cited

U.S. PATENT DOCUMENTS 6,040,668 A * 3/2000 Huynh et al. ............ 318/471
6,135,718 A * 10/2000 Yang ..................... 417/22
6,592,449 B2 * 7/2003 Cipolla et al. ............ 454/184
6,874,327 B1 * 4/2005 Wahler et al. ............ 62/178

\* cited by examiner

*Primary Examiner*—Rina Duda
(74) *Attorney, Agent, or Firm*—Winston Hsu

(57) ABSTRACT

A method of controlling a rotational speed of a fan motor for a heat generating electronic component includes the following steps: (1) obtaining an original PWM pulse in response to an internal die temperature of the electronic component, the original PWM pulse having a first duty cycle which corresponds to a first rotational speed for the fan motor; (2) obtaining an ambient temperature surrounding the electronic component; (3) generating a new PWM pulse based on the original PWM pulse and the ambient temperature, the new PWM pulse having a second duty cycle which corresponds to a second rotational speed for the fan motor; and (4) controlling the fan motor to operate at the second rotational speed. In this method, both the internal die temperature of the electronic component and the ambient temperature surrounding the electronic component are taken into consideration in determining the rotational speed of the fan motor.

14 Claims, 7 Drawing Sheets

METHOD AND CIRCUIT FOR CONTROLLING MOTOR SPEED

FIELD OF THE INVENTION

The present invention relates generally to motor speed control, and more particularly to a method of controlling rotational speed of a fan motor, wherein in addition to being controlled by pulse-width modulation (PWM) technique, the fan motor's rotational speed is also regulated according to an ambient temperature surrounding the particular heat-generating component currently being cooled by a fan having the fan motor. The present invention relates also to a control circuit for implementing the method.

DESCRIPTION OF RELATED ART

It is well known that electric motors are widely used to drive devices such as cooling fans and hard disc drives. For example, a fan motor is used to drive an impeller in a cooling fan so as to produce airflows flowing towards a heat generating component which is being cooled by the cooling fan. For the disclosure hereinafter of the present application, the fan motor is presumed to be used in a cooling fan in a computer system to cool a central processing unit (CPU) thereof, although it is apparent that the present application is not limited to such a single use. In fact, the fan motor can be used in many applications to cool all kinds of heat generating components which require cooling.

For the purpose of conserving electric energy and lowering noise caused by unnecessarily high airflow, the rotational speed of the fan motor is often expected to be controllable. For instance, the fan motor is generally required to operate at its full speed when the CPU overheats, while when the CPU is already cooled down or in a stand-by mode, the rotational speed of the fan motor is expected to be lowered accordingly in order to save energy and reduce annoying noise.

Currently, a method of controlling the rotational speed of the fan motor based on an ambient temperature surrounding the CPU has been used. FIG. 6 illustrates a line indicating change of the fan motor's rotational speed relative to the ambient temperature. When the ambient temperature is relatively low, for example, lower than 40° C., the fan motor has a constant low rotational speed of 1000 rpm (revolutions per minute). When the ambient temperature is in the range of 40° C. to 50° C., the rotational speed of the fan motor increases linearly with the increase of the ambient temperature. As the ambient temperature reaches to 50° C. or higher, the fan motor is maintained at its full speed, i.e., 5000 rpm. By this method, the ambient temperature surrounding the CPU is a controlling factor to determine the rotational speed of the fan motor. The ambient temperature is accordingly capable of being maintained within a satisfactory and acceptable range. However, in the computer system, it takes time to dissipate the thermal energy from the CPU to the surrounding environment. This can lead to a problematic situation where the CPU has become overheated, but the fan motor still operates at a relatively low speed since the heat generated by the CPU has not been dissipated into the surrounding environment to concurrently raise the ambient temperature. In such a situation, the CPU may be damaged due to an insufficient heat dissipation.

Pulse-width modulation (PWM) technique is another motor speed control method. According to PWM technique, a PWM signal including a series of pulses is generated and sent to the fan motor to control the rotational speed thereof. Each of the PWM pulses has a particular duty cycle, which determines the fan motor's rotational speed. The duty cycle is determined according to a temperature of a die in the CPU. When such a temperature is relatively high, the duty cycle currently being provided to the fan motor is correspondingly high, in which case the fan motor operates at a relatively high speed. To the contrary, when such a temperature is relatively low, a PWM pulse with a relatively low duty cycle is sent to the fan motor to cause the fan motor to operate at a relatively low speed. In FIG. 7, an example is shown where the rotational speed of the fan motor increases linearly with the increase of the duty cycle of the PWM pulses. When the duty cycle is 0%, the fan motor approximately has a rotational speed of 1200 rpm, while when the duty cycle is 100%, the fan motor operates at its full speed of 5000 rpm. With respect to this PWM method, the fan motor's speed is controlled based on the temperature of the die in the CPU. The CPU is therefore prevented from overheating. However, in some extraordinary instances where the temperature of the die in the CPU has already been lowered down and the speed of the fan motor has already been lowered, the fan motor is still expected to operate at a relatively high speed. This is because the ambient temperature surrounding the CPU is still comparatively high due to a large amount of heat previously dissipated into the surrounding environment and accumulated within the computer system which is not timely expelled from the computer system. A high temperature in the surrounding environment is harmful to other electronic components within the computer system. Unfortunately, the fan motor's speed becomes decreased at this moment, according to the PWM control principle.

Therefore, it is desirable to provide a motor speed control method wherein one or more of the foregoing disadvantages may be overcome or at least alleviated. It is also desirable to provide a control circuit accordingly to implement the method.

SUMMARY OF INVENTION

The present invention relates, in one aspect, to a method of controlling a rotational speed of a fan motor for a heat generating electronic component. The method includes the following steps: obtaining an original PWM pulse in response to an internal die temperature of the heat generating electronic component, the original PWM pulse having a first duty cycle which corresponds to a first rotational speed for the fan motor; obtaining an ambient temperature surrounding the heat generating electronic component; generating a new PWM pulse based on the original PWM pulse and the ambient temperature, the new PWM pulse having a second duty cycle which corresponds to a second rotational speed for the fan motor; and controlling the fan motor to operate at the second rotational speed.

The present invention relates, in another aspect, to a control circuit for controlling the rotational speed of the fan motor. The control circuit includes a PWM signal generator, a temperature sensor, a PIC microcontroller, and a driver integrated circuit (IC). The PWM signal generator generates an original PWM pulse corresponding to an internal die temperature of the heat generating electronic component. The temperature sensor detects an ambient temperature surrounding the heat generating electronic component. The PIC microcontroller receives the original PWM pulse and the ambient temperature, and generates a new PWM pulse based on the original PWM pulse and the ambient temperature. The driver IC receives the new PWM pulse and controls the fan motor to operate at a specific rotational speed.

Other advantages and novel features of the present invention will become more apparent from the following detailed description of preferred embodiment when taken in conjunction with the accompanying drawings, in which:

DETAILED DESCRIPTION

In accordance with the present motor speed control method, the rotational speed of a fan motor is controlled based on a temperature of a die of the CPU (hereinafter as "internal die temperature"), as well as based on an ambient temperature surrounding the CPU. The fan motor is under dual control, wherein the fan motor's speed is primarily controlled by employing pulse-width modulation (PWM) technique according to the internal die temperature of the CPU, and at the same time, the fan motor's speed is also regulated by responding to the ambient temperature surrounding the CPU when the ambient temperature is considered to be relatively high. Controlling the rotational speed of the fan motor further in response to the ambient temperature is a supplement to the PWM control method. The fan motor, under certain circumstances, further increases its rotational speed when the ambient temperature increases to exceed a particular level.

Figure 1:
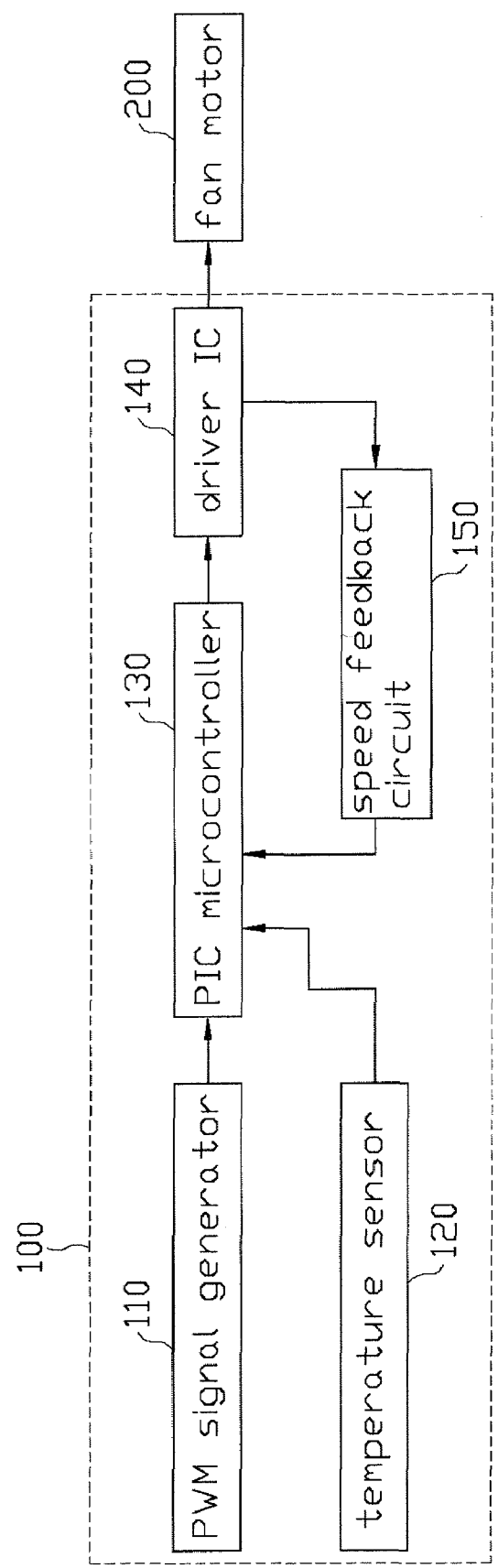
FIG. 1 is a block diagram illustrating a control circuit in accordance with an embodiment of the present invention for controlling rotational speed of a fan motor.

FIG. 1 is a block diagram illustrating an embodiment of the present control circuit 100. The control circuit 100, which is applied to control the rotational speed of the fan motor 200, includes a PWM signal generator 110, a temperature sensor 120, a PIC (Peripheral Interface Controller) microcontroller 130, a driver IC (integrated circuit) 140 of the fan motor 200 and a speed feedback circuit 150. The PWM signal generator 110 inputs an original PWM signal to the PIC microcontroller 130, the original PWM signal being generated by the PWM signal generator 110 according to the internal die temperature of the CPU. The temperature sensor 120 detects the ambient temperature surrounding the CPU and sends a temperature signal indicative of the currently detected temperature to the PIC microcontroller 130. The PIC microcontroller 130, based on the original PWM signal and the ambient temperature, generates a new PWM signal which is then fed to the driver IC 140 of the fan motor 200. The driver IC 140 uses this new PWM signal to control the rotational speed of the fan motor 200. The speed feedback circuit 150 is employed to return the fan motor's speed information back to the PIC microcontroller 130 in order to control the fan motor's speed more precisely. In this particular embodiment illustrated, the speed feedback circuit 150 employed is a conventional one. The principle and operation of the conventional speed feedback circuit 150 is well known to those skilled in the art, and detailed description thereof is omitted here.

The PWM signal generator 110 and the temperature sensor 120 are preferably integrated circuits (ICs) arranged at a printed circuit board (PCB) of the computer system wherein the CPU is mounted on the PCB. The PWM signal generator 110 and the temperature sensor 120 may be circuits that are separated from each other or circuits that are integrated into a single unitary unit or package. In certain embodiments, the PWM signal generator 110 is a PWM signal generating integrated circuit (IC) mounted on the PCB. The PWM signal generator 110 firstly generates the original PWM signal based on the internal die temperature of the CPU. The generated original PWM signal includes a series of pulses with varying pulse width (i.e., duty cycle) according to different temperatures in the die of the CPU. The pulses with different pulse widths have different duty cycles. The duty cycle of the PWM pulse provided to the fan motor 200 determines the fan motor's speed. The PWM signal generator 110 generates the original PWM signal with the duty cycle in response to the internal die temperature of the CPU. The PWM pulse has the duty cycle that corresponds the detected temperature. When the detected temperature in the die of the CPU is relatively low, the PWM signal generator 110 generates PWM pulses having a relatively low duty cycle. To the contrary, when the internal die temperature of the CPU is relatively high, PWM pulses with a relatively high duty cycle are generated in order to increase the speed of the fan motor 100.

In order to obtain the internal die temperature of the CPU and the ambient temperature surrounding the CPU, temperature detecting points must be established. A temperature detecting point means a physical location that represents a point for which temperature control is desired. For example, in order to detect the internal die temperature of the CPU and the ambient temperature, one temperature detecting point is arranged internally in the CPU and located adjacent to the die of the CPU, while another temperature detecting point is arranged external to the CPU and exposed to the surrounding environment so as to detect the ambient temperature surrounding the CPU. For detecting the internal die temperature or the ambient temperature, an appropriately biased thermistor may be used. For example, the thermistor may be selected to have a known resistance at a predetermined reference temperature (e.g., 25° C.).

Figure 2:
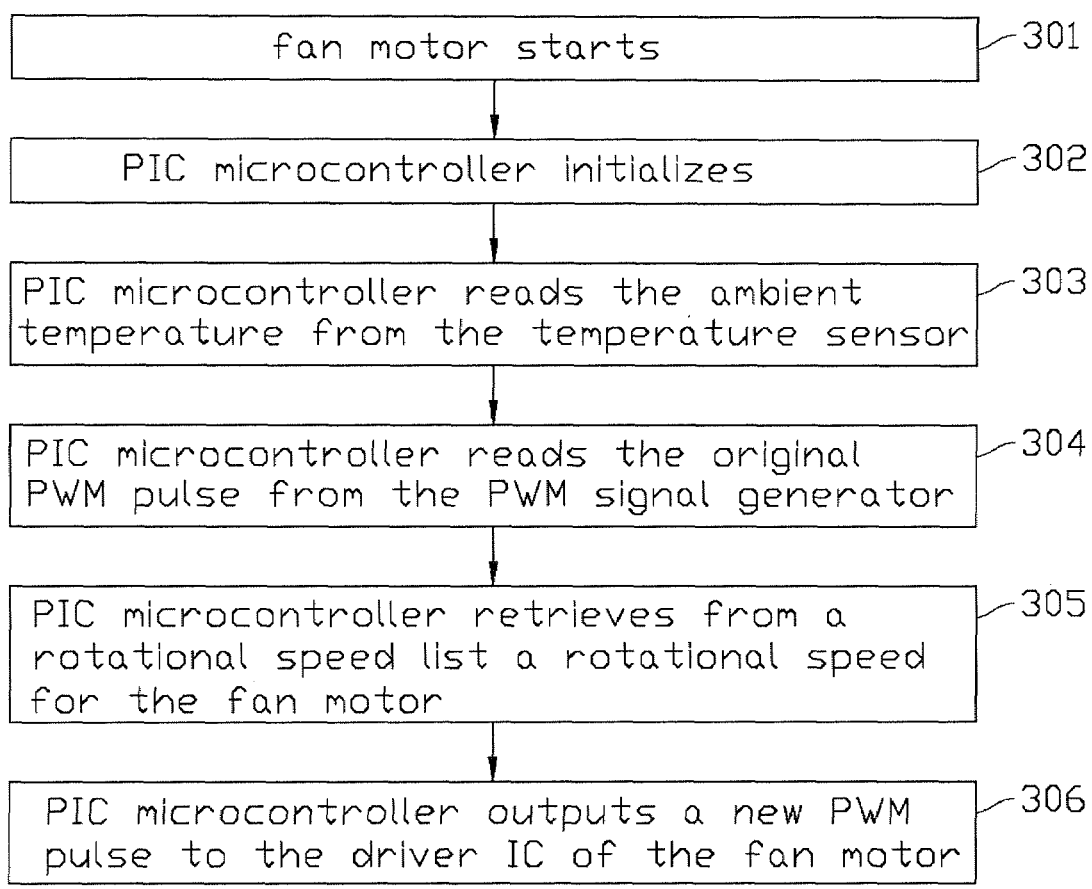
FIG. 2 is a flow chart illustrating a preferred method of the present invention for controlling the rotational speed of the fan motor.

With reference to FIG. 2, a method 300 for controlling the rotational speed of the fan motor 200 by using the above-mentioned control circuit 100 will be explained in detail. The PIC microcontroller 130 is a programmable chip or device. Currently, many PIC microcontrollers are available from particular suppliers or companies. In the illustrated embodiment, a PIC microcontroller produced by Microchip Technology, Inc. with a part number PIC12F683 is selected. As the fan motor 200 starts (step 301), the PIC microcontroller 130 begins to initialize (step 302). Then the PIC microcontroller 130 reads from the temperature sensor 120 the temperature signal indicative of the ambient temperature surrounding the CPU and temporarily stores the ambient temperature data in a particular register within a register array of the PIC microcontroller 130 (step 303). Immediately thereafter, the PIC microcontroller 130 reads from the PWM signal generator 110 the original PWM signal and stores the duty cycle data of the received PWM pulse in another particular register within the register array of the PIC microcontroller 130 (step 304). Based on the ambient temperature and the duty cycle of the received PWM pulse of the original PWM signal, the PIC microcontroller 130 searches a rotation speed list which is previously stored in the PIC microcontroller 130 and find a proper rotational speed for the fan motor (step 305). The rotation speed list will be discussed in more detail later. According to the selected rotational speed, the PIC microcontroller 130 generates a new PWM pulse having a new duty cycle and sends the new PWM pulse to the driver IC 140 of the fan motor 200 to control the fan motor 200 to operate at the selected rotational speed (step 306). The new duty cycle of the new PWM pulse, which is currently being provided to the fan motor 200, determines the fan motor's speed. Specifically, the driver IC 140 regulates according to the new duty cycle the average voltage (or effective voltage) that is actually supplied to the fan motor 200, whereby the fan motor 200 is maintained at the selected rotational speed.

The rotation speed list previously stored in the PIC microcontroller 130 is selected generally based on specific requirements in applications. The rotation speed list may vary with different application specifics. Some examples about the rotation speed list are hereinafter given. It should be recognized that these examples are for illustrative purpose only, and by no means are intended to limit the scope of the present invention. A variety of other suitable rotational speed lists may also be properly configured for the PIC microcontroller 130. An exemplary rotation speed list is given in Table I below.

TABLE I

| Duty Cycle | Ambient Temperature | | | | | |
|---|---|---|---|---|---|---|
| | 35° C. | 40° C. | 45° C. | 50° C. | 55° C. | 60° C. |
| 0% | 1200 | 1580 | 1960 | 2340 | 2720 | 3100 |
| 10% | 1580 | 1960 | 2340 | 2720 | 3100 | 3480 |
| 20% | 1960 | 2340 | 2720 | 3100 | 3480 | 3860 |
| 30% | 2340 | 2720 | 3100 | 3480 | 3860 | 4240 |
| 40% | 2720 | 3100 | 3480 | 3860 | 4240 | 4620 |
| 50% | 3100 | 3480 | 3860 | 4240 | 4620 | 5000 |
| 60% | 3480 | 3860 | 4240 | 4620 | 5000 | 5000 |
| 70% | 3860 | 4240 | 4620 | 5000 | 5000 | 5000 |
| 80% | 4240 | 4620 | 5000 | 5000 | 5000 | 5000 |
| 90% | 4620 | 5000 | 5000 | 5000 | 5000 | 5000 |
| 100% | 5000 | 5000 | 5000 | 5000 | 5000 | 5000 |

Figure 3:
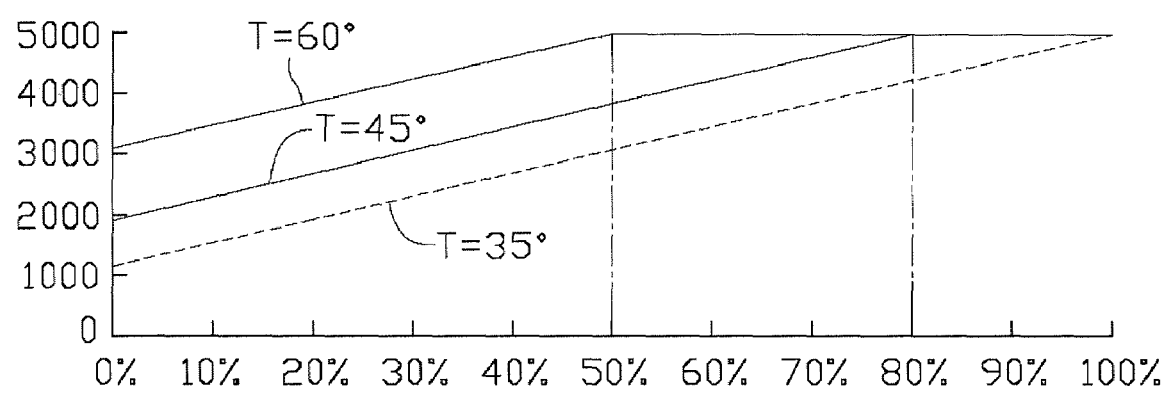
FIG. 3 is a graph showing a first exemplary representation of the rotational speed of the fan motor.

From Table I above, when the ambient temperature surrounding the CPU is lower than a particular reference temperature, for example, 35° C., the fan motor 200 is controlled solely based on the duty cycle of the original PWM pulse generated by the PWM signal generator 110, as shown by broken line in FIG. 3, wherein the fan motor's speed increases linearly with an increase of the duty cycle of the original PWM pulse, from an initial rotational speed of 1200 rpm to its full rotational speed of 5000 rpm.

From Table I above, when the ambient temperature is higher than the reference temperature of 35° C., the fan motor's speed is under dual control. For a particular duty cycle of the original PWM pulse, the fan motor's speed increases linearly with an increase of the ambient temperature. For example, when the duty cycle of the original PWM pulse is 50%, the fan motor's speed increases linearly from 3100 rpm to 5000 rpm as the ambient temperature ranges from 35° C. to 60° C. For a particular ambient temperature which is higher than the reference temperature of 35° C., the rotational speed of the fan motor 200 increases linearly with the increase of the duty cycle of the original PWM pulse and the fan motor 200 reaches its full speed of 5000 rpm before the duty cycle of the original PWM pulse reaches 100%. Corresponding to Table I, two solid lines shown in FIG. 3 represent the rotational speed of the fan motor 200 when the ambient temperatures are 45° C. and 60° C., respectively, wherein the solid line located nearer the broken line represents the rotational speed of the fan motor 200 when the ambient temperatures is 45° C., and the other solid line represents the rotational speed of the fan motor 200 when the ambient temperatures is 60° C. Each of the solid lines is located above the broken line and has a first inclined segment that is parallel to the broken line and a second horizontal segment. In the first inclined segment, the fan motor's speed increases linearly with the increase of the duty cycle of the original PWM pulse. In the second horizontal segment, the fan motor 200 has a constant rotational speed of 5000 rpm, the full speed of the fan motor 200. When the ambient temperature is 45° C., the fan motor 200 reaches its full speed of 5000 rpm when the duty cycle of the original PWM pulse is 80%. When the ambient temperature is 60° C., the fan motor 200 reaches its full speed when the duty cycle of the original PWM pulse is 50%.

Another exemplary rotation speed list is given in Table II below.

TABLE II

| Duty Cycle | Ambient Temperature | | | | | |
|---|---|---|---|---|---|---|
| | 35° C. | 40° C. | 45° C. | 50° C. | 55° C. | 60° C. |
| 0% | 1200 | 1390 | 1580 | 1770 | 1960 | 2150 |
| 10% | 1580 | 1580 | 1580 | 1770 | 1960 | 2150 |
| 20% | 1960 | 1960 | 1960 | 1960 | 1960 | 2150 |
| 30% | 2340 | 2340 | 2340 | 2340 | 2340 | 2340 |
| 40% | 2720 | 2720 | 2720 | 2720 | 2720 | 2720 |
| 50% | 3100 | 3100 | 3100 | 3100 | 3100 | 3100 |
| 60% | 3480 | 3480 | 3480 | 3480 | 3480 | 3480 |
| 70% | 3860 | 3860 | 3860 | 3860 | 3860 | 3860 |
| 80% | 4240 | 4240 | 4240 | 4240 | 4240 | 4240 |
| 90% | 4620 | 4620 | 4620 | 4620 | 4620 | 4620 |
| 100% | 5000 | 5000 | 5000 | 5000 | 5000 | 5000 |

From Table II above, the fan motor's speed is controlled solely based on the duty cycle of the original PWM pulse when the ambient temperature surrounding the CPU is lower than the reference temperature of 35° C.

From Table II above, for a particular duty cycle of the original PWM pulse, the rotational speed of the fan motor 200 increases linearly with the increase of the ambient temperature when the ambient temperature is in a particular range. For example, when the duty cycle of the original PWM pulse is 0%, the fan motor's speed increases linearly as the ambient temperature increases from 35° C. to 60° C. or even higher. When the duty cycle of the original PWM pulse is 10%, the fan motor's speed increases linearly as the ambient temperature increases from 45° C. to 60° C. or even higher. As such, the rotational speed of the fan motor 200 is not only controlled by the duty cycle of the original PWM pulse, but also regulated according to the ambient temperature surrounding the CPU.

Figure 4:
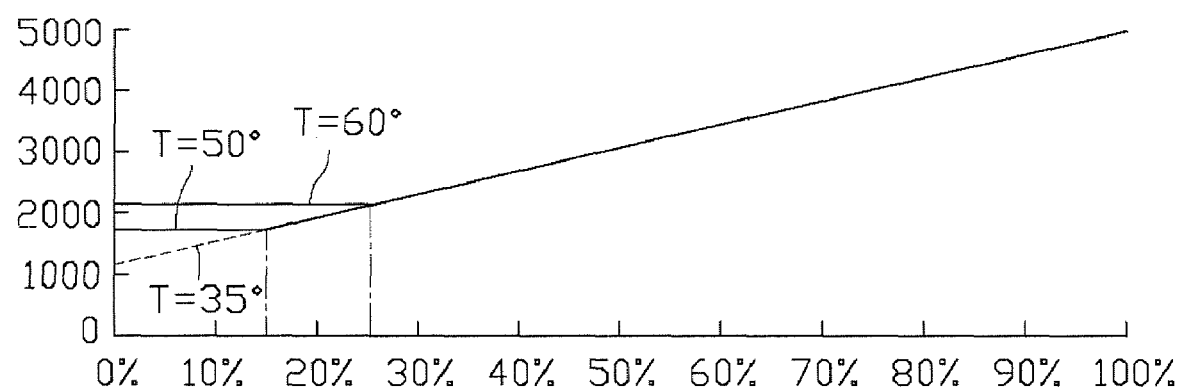
FIG. 4 is a graph showing a second exemplary representation of the rotational speed of the fan motor.

From Table II above, for a particular ambient temperature which is higher than the reference temperature of 35° C., the fan motor 200 has a constant rotational speed when the duty cycle of the original PWM pulse is lower than a particular level. When duty cycle of the original PWM pulse is higher than this particular level, the fan motor's speed is solely controlled based on the duty cycle of the original PWM pulse. Corresponding to Table II, two solid lines shown in FIG. 4 represent the rotational speed of the fan motor 200 when the ambient temperatures are 50° C. and 60° C., respectively. Each of the solid lines has a first horizontal segment, which is located above the broken line, and a second inclined segment, which is overlapped with the broken line. When the ambient temperature is 50° C. and the duty cycle of the original PWM pulse is lower than 15%, the fan motor 200 has a constant rotational speed of 1770 rpm (referring to Table II), which is higher than a rotational speed obtained when the fan motor 200 is controlled solely based on the duty cycle of the original PWM pulse. When the ambient temperature is 60° C. and the duty cycle of the original PWM pulse is lower than 25%, the fan motor 200 has a constant rotational speed of 2150 rpm (referring to Table II). When the ambient temperature is 50° C. and the duty cycle of the original PWM pulse is higher than 15%, the fan motor's speed is solely controlled based on the duty cycle of the original PWM pulse. When the ambient temperature is 60° C. and the duty cycle of the original PWM pulse is higher than 25%, the fan motor's speed is also solely controlled based on the duty cycle of the original PWM pulse.

Table III below gives a further example about the rotation speed list.

TABLE III

| Duty Cycle | Ambient Temperature | | | | | |
|---|---|---|---|---|---|---|
| | 35° C. | 40° C. | 45° C. | 50° C. | 55° C. | 60° C. |
| 0% | 1200 | 1390 | 1580 | 1770 | 1960 | 2150 |
| 10% | 1580 | 1580 | 1580 | 1770 | 1960 | 2150 |
| 20% | 1960 | 1960 | 1960 | 1960 | 1960 | 2150 |
| 30% | 2340 | 2340 | 2340 | 2340 | 2340 | 2506.3 |
| 40% | 2720 | 2720 | 2720 | 2720 | 2720 | 2862.5 |
| 50% | 3100 | 3100 | 3100 | 3100 | 3100 | 3218.8 |
| 60% | 3480 | 3480 | 3480 | 3480 | 3480 | 3575 |
| 70% | 3860 | 3860 | 3860 | 3860 | 3860 | 3931.3 |
| 80% | 4240 | 4240 | 4240 | 4240 | 4240 | 4287.5 |
| 90% | 4620 | 4620 | 4620 | 4620 | 4620 | 4643.8 |
| 100% | 5000 | 5000 | 5000 | 5000 | 5000 | 5000 |

From Table III above, when the ambient temperature is lower than a relatively high temperature level, for example, 60° C., the rotation speed list shown in Table III is the same as that shown in Table II.

Figure 5:
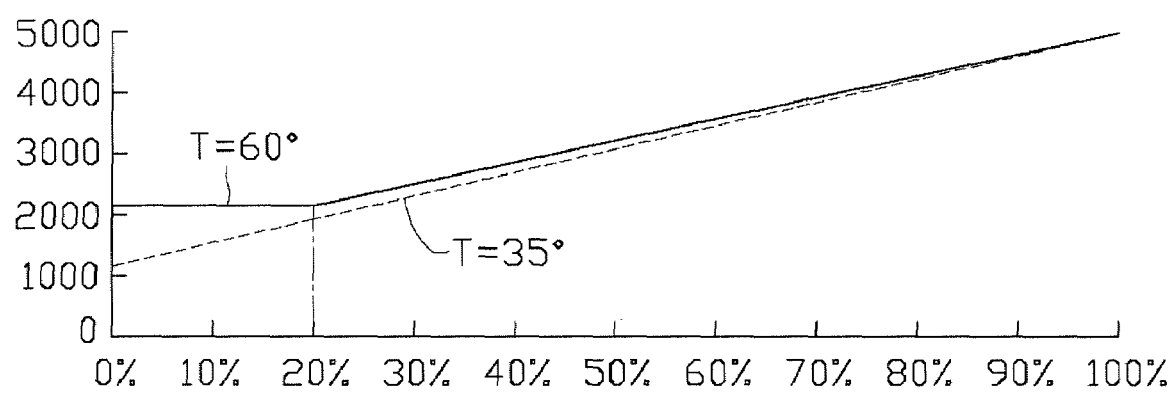
FIG. 5 is a graph showing a third exemplary representation of the rotational speed of the fan motor.
Figure 6:
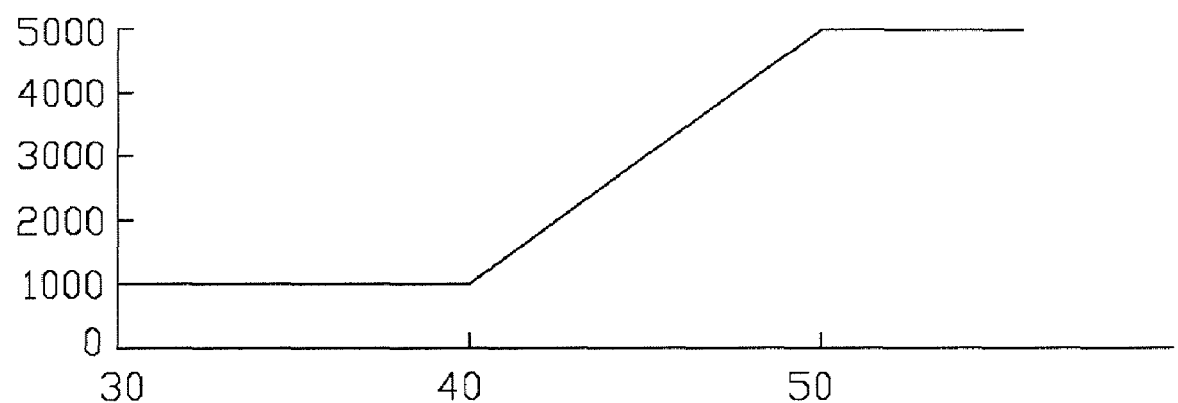
FIG. 6 is a graphic exemplary representation of a fan motor's rotational speed relative to an ambient temperature in accordance with the conventional art.
Figure 7:
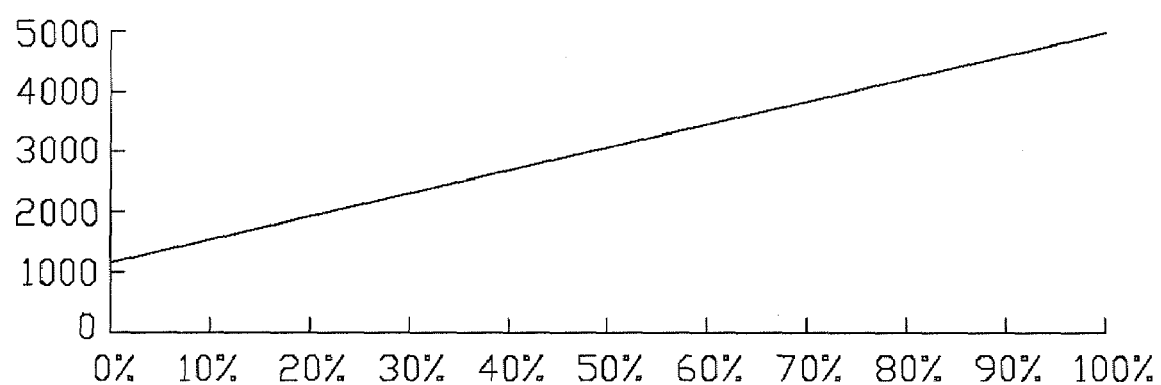
FIG. 7 is another graphic exemplary representation of a fan motor's rotational speed relative to a duty cycle of a PWM signal in accordance with the conventional art.

In Table III, when the ambient temperature reaches the relatively high temperature level of 60° C. or even higher, the fan motor's speed is controlled simultaneously by the duty cycle of the original PWM pulse and the ambient temperature. As shown in FIG. 5, when the ambient temperature is 60° C., the rotational speed of the fan motor 200 is represented by the solid line therein. The solid line has a horizontal segment and an inclined segment, both of which are located above the broken line, which represents the fan motor's speed when the ambient temperature is 35° C. The horizontal segment and the inclined segment connect at a point where the duty cycle of the original PWM pulse is 20%. In the horizontal segment, the fan motor 200 has a constant rotational speed of 2150 rpm. The inclined segment of the solid line has a lower slope than the broken line. The inclined segment of the solid line and the broken line converge when the fan motor 200 reaches its full speed of 5000 rpm.

From the aforementioned tables (Table I, II and III) and the figures of FIGS. 3-5, the rotational speed of the fan motor 200 is changed regularly according to the duty cycle of the original PWM pulse and the ambient temperature, which is helpful in reducing annoying noise caused by abrupt change in speed. If the PIC microcontroller 130 adopted in the control circuit 100 has more storage space available for storing an even larger volume of data about the rotational speed for the fan motor 200, the fan motor 200 accordingly can be controlled more precisely.

As mentioned above, the fan motor's speed is controlled by the new duty cycle of the new PWM pulse currently being provided to the fan motor 200. The new PWM pulse with the new duty cycle is generated by the PIC microcontroller 130 according to the duty cycle of the original PWM pulse and the ambient temperature surrounding the CPU. In the above-illustrated rotation speed lists shown in Table I, II and III, the fan motor's speed has a linear relationship with the duty cycle of the original PWM pulse when the ambient temperature is 35° C. In particular, when the duty cycle of the original PWM pulse increases by 10%, the fan motor's speed increases by 380 rpm. Therefore, the new duty cycle of the new PWM pulse can be obtained through the following equation: $PWM_{(new)} = ((R - R_0)/380) * 10\%$, where PWM (new) represents the new duty cycle of the new PWM pulse, R represents the rotational speed for the fan motor 200, and $R_0 = 1200$ rpm, which represents the rotational speed for the fan motor 200 when the ambient temperature is 35° C. and the duty cycle of the original PWM pulse is 0%. For example, as shown in Table III, when the duty cycle of the original PWM pulse is 60% and the ambient temperature is 60° C., the fan motor 200 has a rotational speed of 3575 rpm. According to the aforementioned equation, the new duty cycle of the new PWM pulse outputted at this moment is 62.5%, which is higher than 60%, the duty cycle of the original PWM pulse. The PIC microcontroller 130 accordingly outputs a new PWM pulse having a duty cycle of 62.5% at this particular moment to the driver IC 140 to control the fan motor 200 to operate at a rotational speed of 3575 rpm. As such, the driver IC 140 of the fan motor 200 dose not require to be redesigned.

According to the present speed control method 300, the fan motor's speed is controlled based on the duty cycle of the original PWM pulse (or the internal die temperature of the CPU) in combination with the ambient temperature surrounding the CPU. Typically, when the ambient temperature surrounding the CPU is relatively low, the fan motor's speed is mainly controlled by the duty cycle of the original PWM pulse. When the ambient temperature begins to increase, the rotational speed of the fan motor 200 increases correspondingly to cope with the increase of the ambient temperature. In the present method 300, both the internal die temperature of the CPU and the ambient temperature surrounding the CPU are taken into consideration in determining the rotational speed of the fan motor 200. The two temperatures are therefore capable of being kept within an acceptable low level.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of controlling a rotational speed of a fan motor for a heat generating electronic component, comprising steps of:
    obtaining an original PWM pulse in response to an internal die temperature of said heat generating electronic component, the original PWM pulse having a first duty cycle which corresponds to a first rotational speed for the fan motor;
    obtaining an ambient temperature surrounding said heat generating electronic component;
    generating a new PWM pulse based on the original PWM pulse and the ambient temperature, the new PWM pulse having a second duty cycle which corresponds to a second rotational speed for the fan motor; and
    controlling the fan motor to operate at the second rotational speed;
    wherein when the ambient temperature is lower than a reference temperature, the second rotational speed is the same as the first rotational speed.

2. The method of claim 1, wherein said new PWM pulse is generated by a PIC microcontroller in which a rotation speed list for the fan motor is stored, the rotation speed list has a unique rotation speed corresponding to the original PWM pulse and the ambient temperature, and the new PWM pulse corresponds to the unique rotation speed.

3. The method of claim 1, wherein when the ambient temperature is higher than a reference temperature and when the first duty cycle is lower than a particular duty cycle, the second rotational speed is higher than the first rotational speed.

4. The method of claim 1, wherein when the ambient temperature is higher than a reference temperature and when the first duty cycle is higher than a particular duty cycle, the second rotational speed is the same as the first rotational speed.

5. The method of claim 1, wherein when the ambient temperature is higher than a reference temperature, the second rotational speed is higher than the first rotational speed.

6. The method of claim 1, wherein given a particular duty cycle for the original PWM pulse, the second rotational speed increases linearly with an increase of the ambient temperature when the ambient temperature is in a specific range.

7. The method of claim 1, wherein given a particular duty cycle for the original PWM pulse, the second rotational speed is the same as the first rotational speed when the ambient temperature is in a specific range.

8. The method of claim 1, wherein given a particular ambient temperature, the second rotational speed increases linearly with an increase of the first duty cycle when the first duty cycle is in a specific range.

9. The method of claim 1, wherein given a particular ambient temperature, the second rotational speed is kept unchanged when the first duty cycle is in a specific range.

10. The method of claim 1, wherein the first rotational speed increases linearly with an increase of the first duty cycle.

11. A control circuit for controlling a rotational speed of a fan motor for a heat generating electronic component, comprising:
    a PWM signal generator generating an original PWM pulse corresponding to an internal die temperature of said heat generating electronic component;
    a temperature sensor detecting an ambient temperature surrounding said heat generating electronic component;
    a PIC microcontroller receiving the original PWM pulse and the ambient temperature, and generating a new PWM pulse based on the original PWM pulse and the ambient temperature; and
    a driver integrated circuit receiving the new PWM pulse and controlling the fan motor to operate at a specific rotational speed;
    wherein the new PWM pulse is the same as the original PWM pulse when the ambient temperature is lower than a reference temperature.

12. The control circuit of claim 11, wherein the PIC microcontroller stores therein a rotation speed list for the fan motor, and the rotation speed list has said specific rotational speed therein.

13. A method for regulating a speed of a fan for cooling a heat source, comprising the following steps:
    measuring temperature of the heat source at two different locations of the heat source to obtain a first temperature and a second temperature;
    generating a first PWM signal having a first duty cycle according to the first temperature;
    inputting the second temperature into a memory register;
    comparing the second temperature with a data stored in the memory register, wherein the data including temperature data and rotation speed data;
    obtaining a rotation speed from the rotation speed data according to a result of the comparison between the second temperature and the temperature data;
    generating a second PWM signal having a second duty cycle in accordance with the rotation speed obtained by the comparison; and
    regulating the speed of the fan according to the second PWM signal;
    wherein when the second temperature is not larger than a specific temperature, the first duty cycle is equal to the second duty cycle.

14. The method of claim 13, wherein when the second temperature is larger than the specific temperature, the first duty cycle is smaller than the second duty cycle.

* * * * *